United States Patent
Yokoyama et al.

(10) Patent No.: US 6,845,852 B2
(45) Date of Patent: Jan. 25, 2005

(54) BRAKE CONTROL APPARATUS OBTAINING BRAKING FORCE BY PRESSING OF FRICTION MEMBER USING MOTOR

(75) Inventors: Takahisa Yokoyama, Anjo (JP); Takayuki Takeshita, Anjo (JP); Haruo Arakawa, Toyota (JP)

(73) Assignee: Advics Co., Ltd., Aichi-ken (JP)

( * ) Notice: Subject to any disclaimer, the term of this patent is extended or adjusted under 35 U.S.C. 154(b) by 0 days.

(21) Appl. No.: 10/391,203

(22) Filed: Mar. 19, 2003

(65) Prior Publication Data

US 2004/0011603 A1 Jan. 22, 2004

(30) Foreign Application Priority Data

Mar. 20, 2002 (JP) .......................................... 2002-78472
Feb. 17, 2003 (JP) .......................................... 2003-38561

(51) Int. Cl.[7] ............................................. F16D 55/08
(52) U.S. Cl. ...................... 188/72.8; 188/71.8; 188/162; 188/196 D; 188/196 V
(58) Field of Search ................................ 188/72.1, 72.7, 188/72.8, 71.7, 71.8, 71.9, 158, 162, 196 D, 196 V

(56) References Cited

U.S. PATENT DOCUMENTS

| | | |
|---|---|---|
| 5,094,079 A | 3/1992 | Leigh-Monstevens et al. |
| 5,949,168 A * | 9/1999 | Dieckmann et al. ...... 310/75 R |
| 6,173,820 B1 * | 1/2001 | Blosch et al. ................ 188/158 |
| 6,279,691 B1 * | 8/2001 | Takahashi et al. ......... 188/72.8 |
| 6,311,807 B1 * | 11/2001 | Rinsma ...................... 188/71.9 |
| 2001/0023798 A1 * | 9/2001 | Usui et al. .................. 188/72.1 |

FOREIGN PATENT DOCUMENTS

| | | |
|---|---|---|
| JP | A-61-143253 | 6/1986 |
| JP | A-6-183330 | 7/1994 |
| JP | A2001-41269 | 2/2001 |

* cited by examiner

*Primary Examiner*—Douglas C. Butler
*Assistant Examiner*—Bradley King
(74) *Attorney, Agent, or Firm*—Posz & Bethards, PLC

(57) ABSTRACT

A vehicular brake apparatus, which is provided at a shaft of a motor that revolves due to depression of a brake pedal, has a variable gear mechanism including a non-circular spur gear that changes a reduction ratio from a high gear ratio to a low gear ratio along with revolution. Revolution is converted to linear movement by roller bearings interposed between two ramp portions each having a straight inclined surface, and a friction member is pressed against a disk by a friction material holding portion being moved in a straight direction. Further, a braking force is generated on the disk by the friction member and another friction member provided on the opposite side of the caliper. As a result, it is possible to generate a highly responsive braking force by the high gear ratio when revolution of the motor initially increases, and possible to reduce electric power consumption using a highly efficient motor speed by changing from the high gear ratio to the low gear ratio in accordance with the motor revolution speed.

3 Claims, 13 Drawing Sheets

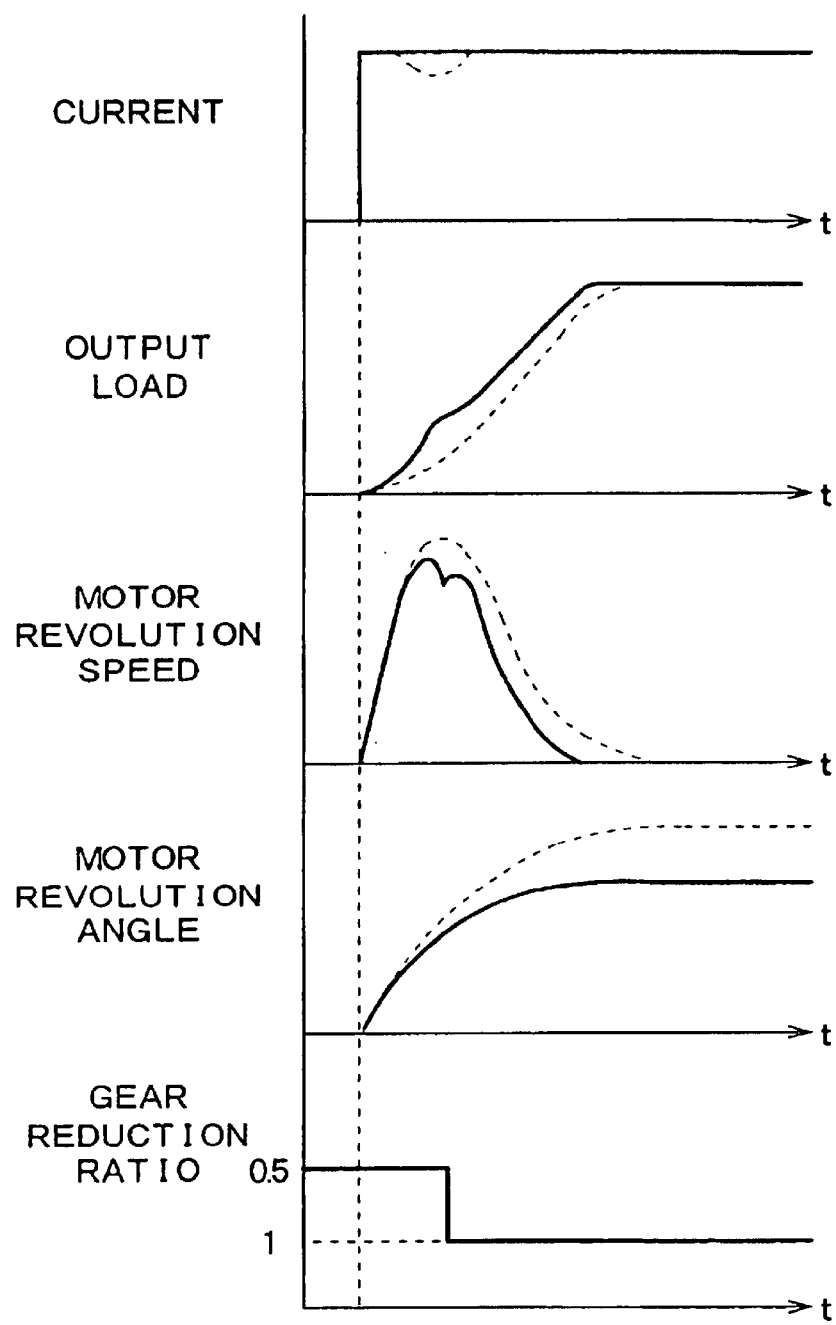
F I G . 10

BRAKE CONTROL APPARATUS OBTAINING BRAKING FORCE BY PRESSING OF FRICTION MEMBER USING MOTOR

CROSS REFERENCE TO RELATED APPLICATION

This application is based upon and claims the benefit of Japanese Patent Application No. 2002-78472 filed on Mar. 20, 2002, and No. 2003-38561 filed on Feb. 17, 2003 the content of which are incorporated herein by reference.

FIELD OF THE INVENTION

The present invention relates to a vehicular brake control apparatus that generates braking force by pressing of a friction member based on torque of a motor.

BACKGROUND OF THE INVENTION

Conventionally, in a brake apparatus that obtains braking force by pressing of a friction member using a motor, a relationship between a stroke of an actuator and rigidity thereof is nonlinear. Accordingly, in the case of increasing braking force at a constant proportion, a speed of the motor becomes high during an initial period of brake operation, and low during a final period thereof. In this case, it is not possible to use an intermediate speed in which efficiency of the motor is the best, and thus improvement in motor responsiveness is impaired. Further, it is not possible to set a reduction ratio of the motor so as to simultaneously increase responsiveness and efficiency. Thus, the reduction ratio must be set to a moderate value so that improvement in motor efficiency and reduction in electric power consumption are hindered.

To address this, an electronic brake using a ball ramp mechanism has been disclosed in which a tilting surface of the ball ramp mechanism for reducing electric power consumption is formed from a plurality of tilting portions each of which has different tilting angle (Japanese Patent Laid-open No. 2001-41269).

However, in the electronic brake, the titling angle of the tilting surface is changed, and thus it is not possible to dispose a plurality of balls at the tilting surface, and as a result, load is supported by a single ball. Therefore, a surface pressure of a point contact portion of the ball and the tilting surface is extremely large, and motor efficiency decreases because energy for operating the motor is lost.

SUMMARY OF THE INVENTION

It is an object of the present invention to improve responsiveness of a brake apparatus that generates braking force by pressing of a friction member by transmission of torque of a motor.

Further, it is another object of the present invention to improve motor efficiency of a brake apparatus that generates braking force by pressing of a friction member by transmission of torque of a motor.

A brake apparatus according to a first aspect of the present invention includes: a motor that is electrically driven to revolve; a movement conversion portion that reduces a speed of a revolution of the motor from a low gear ratio to a high gear ratio in at least two steps in accordance with a speed of revolution of the motor or a quantity of state corresponding to a speed of revolution, and converts the reduced speed of revolution of the motor to a linear movement; and a brake force generation portion that generates a braking force by pressing of a friction member using the linear movement of the movement conversion portion.

According to the first aspect, while the movement conversion portion increases a reduction gear ratio from the low gear ratio to the high gear ratio, the revolution of the motor that revolves by being electrically driven is converted to a linear movement that generates the braking force by pressing of the friction member. As a result, when a load is low during initiation of revolution of the motor, namely, during a brake operation initiation period, a rapid linear movement and highly efficient motor operation is possible, due to the low gear ratio. Along with this, when the load is high when the brake operation has progressed, it is possible to generate brake pressure using the most efficient speed of the motor using the high gear ratio. As a result, the responsiveness of the braking force generation of the brake apparatus is improved, and further, efficient operation of the motor in order to lower electric power consumption is facilitated.

A brake apparatus according to a second aspect of the present invention includes: a motor having a shaft; a linear movement conversion portion that converts revolution of the motor to a linear movement; and a brake force generation portion which has a master cylinder that generates a brake hydraulic pressure for a wheel cylinder of each wheel, by sliding of a piston generated by the linear movement of the linear movement conversion portion, and which generates a braking force by pressing of a friction member using the brake hydraulic pressure. In this brake apparatus, the piston is provided with a small diameter portion and a large diameter portion having a diameter larger than the small diameter portion. Further, with regard to the master cylinder, a discharged amount of a brake fluid compared to a stroke amount is changed from a large to a small amount, by variation of the piston diameter that actually acts upon the brake hydraulic pressure when the piston is sliding.

According to the second aspect, the revolution of the motor having the shaft is converted to linear movement, and when the piston of the master cylinder is pushed, the discharge amount of the brake fluid corresponding to the piston stroke amount changes from a large to a small amount. As a result, when the piston starts to slide, the brake pressure is generated with high responsiveness. Following this, it is possible to continue reciprocation of the cylinder without impairing the efficiency of the motor. Accordingly, it is possible to promote reduction of power consumption and improved responsiveness.

It should be noted that, according to the present invention, the term "reduction ratio" refers to the reduction ratio of an input shaft to an output shaft of the speed reduction device, or a movement amount ratio. Put in terms of the "gear ratio" of the vehicular speed reduction device, a low reduction ratio is equivalent to a high gear ratio and a high reduction ratio is equivalent to a low gear ratio.

BRIEF DESCRIPTION OF THE DRAWINGS

FIG. 10 is a time chart showing operation of the brake appratus of the third embodiment;

DETAILED DESCRIPTION OF PREFERRED EMBODIMENTS (First Embodiment)

Figure 1:
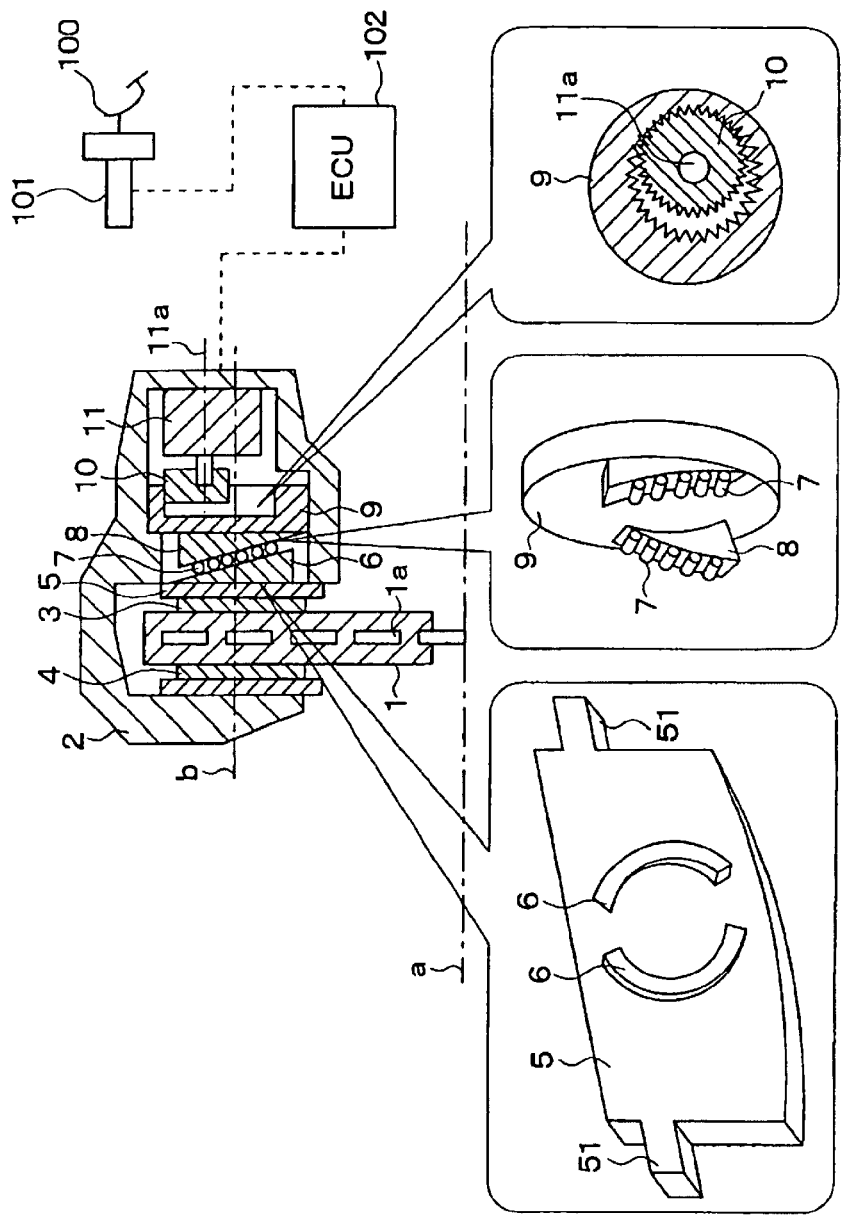
FIG. 1 is a cross-sectional view showing a brake apparatus according to a first embodiment of the present invention.

A first embodiment according to the present invention will be described with reference to the drawings. FIG. 1 is a cross-sectional view showing a structure of the first embodiment.

A vehicular brake apparatus according to the first embodiment generates a braking force according to a depression amount of a brake pedal 100. A pedal operation sensor 101 detects an operation amount of the brake pedal 100 operated by a driver. Either one of the depression amount (a stroke amount) and a depression force of the brake pedal 100 may be adopted as the operation amount.

The pedal operation sensor 101 is connected to an ECU 102, and outputs a detected pedal operation amount signal to the ECU 102. The ECU 102 calculates application force of friction materials 3 and 4 that corresponds to braking force that needs to be generated based on the pedal operation amount signal, a vehicle speed signal, and other sensor signals (these other sensors are (not shown)). In other words, the ECU 102 calculates a revolution speed of a DC motor (hereinafter simply referred to as "motor") 11. The motor 11 revolves so as to be in accordance with the calculated revolution speed. Further, even when the pedal 100 is not depressed, the ECU 102, for example, calculates a target braking force for traction control for each of a vehicle wheel. Accordingly, the motor 11 is driven to generate the target braking force.

A disk 1 rotates integrally with the vehicle wheel (not shown) centering on a disk axis X. The disk 1 is provided with air duct holes 1a for cooling. A caliper 2 which has a substantially U-shaped cross-section is disposed so as to straddle the outer circumference portion of the disk 1. This caliper 2 is movable in the direction of the disk axis X, and is attached to a vehicle body.

The first friction material 3 and the second friction material 4 assembled to the caliper 2 are disposed so as to face respective end faces of the disk axis X direction of the disk 1. The first friction material 3 is disposed on a disk side surface of a tabular friction material holding portion 5, and the second friction material 4 is fixed to the caliper 2. Holding portion guides 51 of the friction material holding portion 5 are slidably fitted into the caliper 2 such that the friction material holding portion 5 is held by the caliper 2 and is movable in a rotation axis Y direction in a direction parallel to the disk axis X direction. In addition, the friction material holding portion 5 is such that braking operation in which the friction materials 3 and 4 are pressed against the disk 1 can be executed. The disk 1, the caliper 2, the first and the second friction materials 3 and 4, and the friction material holding portion 5 correspond to a braking force generation portion according to the present invention.

First ramp portions 6 each having a straight inclined surface with a predetermined gradient are formed at a surface of the friction material holding portion 5 that is on the opposite side to the disk 1. The first ramp portions 6 are disposed such that each straight inclined surface is parallel to a straight inclined surface of respective second ramp portions 8. The first ramp portions 6 are slidable with respect to the second ramp portions 8 via roller bearings 7 having a plurality of rollers. These first and second ramp portions 6 and 8, and the roller bearings 7 correspond to a linear movement conversion portion of the present invention.

The motor 11 is fixed to an end portion of the caliper 2. A second gear 10, which is a non-circular spar gear, is provided at a shaft 11a of the motor 11. A first gear 9, which is a non-circular ring gear, has a rotation axis aligned with the rotation axis Y, and is disposed so as to mesh with an outer circumference of the second gear 10. Therefore, the first gear 9 is able to rotate with respect to the caliper 2 and is held so as not to move in the rotation axis Y direction. The first gear 9 and the second gear 10 configure a variable gear mechanism that is a variable speed reduction portion.

According to the configuration of the first embodiment, if a normal constant gear ratio is taken as a gear ratio reference (i.e., 1 in the case of a normal gear mechanism that is a non-continuous gear mechanism), the variable gear mechanism is set to continuously change from 0.2 to 1.5, or in other words, to change from a high gear ratio (a low reduction ratio) to a low gear ratio (a high reduction ratio).

The second ramp portions 8 are formed, for example, divided into two ramp portions on the opposite surface of the first gear 9 to the motor 11, namely, are formed on the surface facing toward the disk 1 around the circumference of the rotation axis Y. Moreover, as previously mentioned, the respective inclined surfaces are parallel surfaces having a constant gradient. Accordingly, the second ramp portions 8 move around a circumference of the rotation axis Y due to rotation of the first gear 9.

The first ramp portions 6 formed on the surface of the friction material holding portion 5 are disposed around the circumference of the rotation axis Y and divided into two ramp portions each having a straight inclined surface with a gradient equal to that of the respective second ramp portions. Accordingly, the first ramp portions 6 face the second ramp portions 8 and are slidable with respect to the second ramp portions 8.

Figure 2:
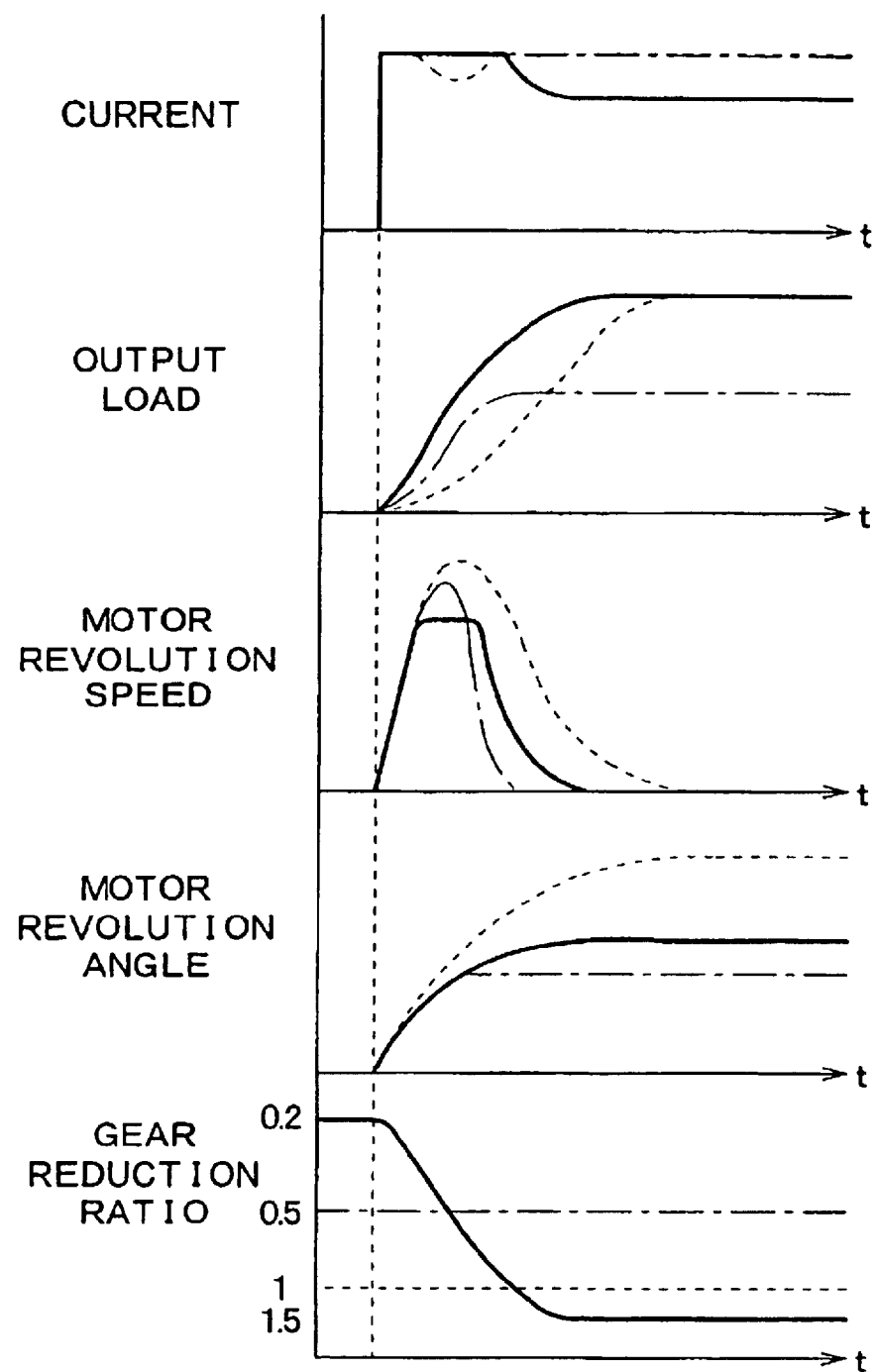
FIG. 2 is a time chart showing operation of the brake appratus according to the first embodiment.

Operation of the first embodiment having above mentioned configuration will now be described with reference to time charts of FIG. 2. Further, FIG. 2 also shows, for the sake of comparison, the operation in the case of the normal constant gear ratio of 1 and the operation in the case of a constant gear ratio of 0.5 of a high gear ratio, which is higher than the former.

Prior to execution of the brake operation, the variable gear mechanism is in a state in which a gear reduction ratio has an initial value of 0.2. When the brake pedal 100 is depressed, a current (motor current) to the motor 11 begins to increases in a step-like manner. In the range of initial increase of the rotation of the motor 11, a brake pressure (corresponding to an output load within FIG. 2) is small. However, since the variable gear mechanism is in a high gear ratio, it is possible to drive the variable gear mechanism without increasing the speed of revolution of the motor 11 excessively. In other words, it is possible to drive the motor 11 at high efficiency and rapidly move the friction materials.

As the torque of the motor 11 increases, the gear ratio of the variable gear mechanism continuously changes from the high gear ratio of 0.2 to a low gear ratio of 1.5. Accompanying this, as compared to the case of the high gear ratio, revolution speed of the motor maintains an efficient speed, and it is possible to obtain high output torque. Accordingly, it is possible to increase the output load (the brake pressure) up to a maximum load with maintaining high responsiveness. Moreover, when the maximum load is applied, it is possible to use the lower gear ratio of 1.5, rather than the normal gear ratio of 1. As a result, the current at maximum load is maintained at a small current value, and it is possible to reduce electric power consumption to a small amount.

On the contrary, the case of the constant gear ratio of 1, which is conventional, will be described. The revolution speed of the motor begins to increase due to flow of the motor current according with depression of the brake pedal. In this case, since the gear ratio is lower than that of the present embodiment, increase of the output load is delayed. Accordingly, the motor speed increases excessively, and thus there is a reduction in the motor current due to generation of counter-electromotive force in the motor. In addition, due to the delayed increase in the output load (the brake pressure), the revolution speed of the motor speed falls, and the motor current increases and moves to a steady value and state, and the output load is maintained at a maximum.

Moreover, when the constant gear ratio is set to the higher gear ratio of 0.5, as shown by the long and short dashed line, the initial increase in the output load is fast as compared to that in the case of the constant gear ratio of 1. However, since the output load only becomes about half that of the constant gear ratio of 1, it is not possible to obtain the necessary brake pressure.

As mentioned above, according to the first embodiment, the output of the motor 11 which revolves in accordance with the depression amount of the brake pedal 100 is reduced by continuously changing the reduction speed gear ratio from the high gear ratio to the low gear ratio, using the variable gear mechanism as the variable speed reduction portion. In addition, the torque resulting from the speed reduction is converted to linear movement by the linear movement conversion portion composed from the first ramp portions 6, the roller bearing 7, and the second ramp portions 8. This linear movement then presses the friction materials of the brake. As a result, when the brake operation is initiated, it is possible to press the friction materials rapidly using the high gear ratio. Further, following this, as the gear reduction ratio is gradually changed to the low gear ratio side, it is possible to increase the responsiveness of the output load and reduce the electric power consumption of the motor 11.

(Second Embodiment)

Figure 3:
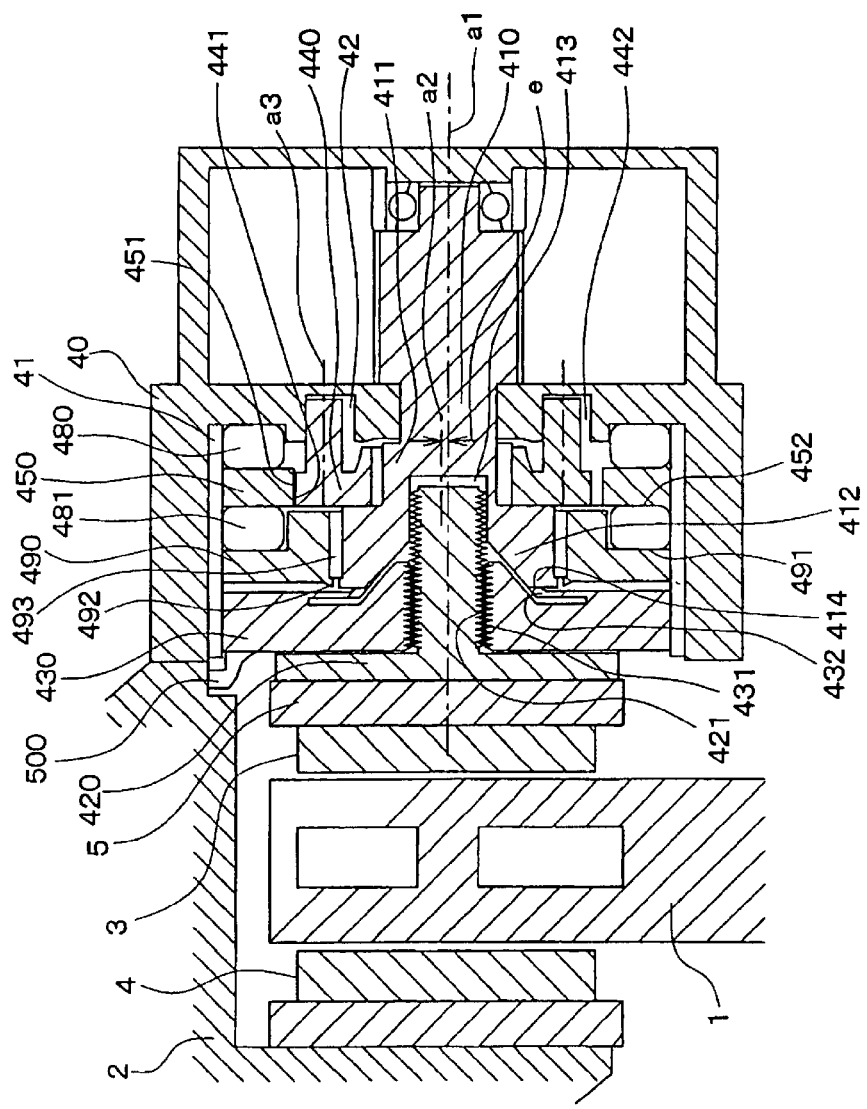
FIG. 3 is a cross-sectional view showing the brake appratus during an initial period of brake operation according to a second embodiment of the present invention.

Next, a second embodiment according to the present invention will be described. FIG. 3 is a cross-sectional view showing a brake appratus of the second embodiment. Elements that are the same as the first embodiment have been omitted or are shown in simplified form with the same reference numerals attached.

According to the second embodiment, as with the first embodiment, a motor 11 is fixed to a housing 40 that is provided integrally with a caliper 2. Further, a female screw member 430, a clutch release member 490, an internal gear 450, and a bearing 41 which allows roller bearings 480 and 481 to be freely slidable in a circumferential direction and an axial direction which is perpendicular to the circumferential direction, are provided within the housing 40. It should be noted that, hereinafter, an axis center direction of a shaft 410 of the motor 11 will simply be referred to as an axial direction, and a revolution direction of the rotation axis will be referred to as a circumferential direction. In addition, an axial direction from the motor 11 to the disk 1 and the opposite direction thereof, will be referred to as the forward direction and the reverse direction, respectively.

The shaft 410 of the motor 11 revolves around a central axis a1. An eccentric revolution portion 411 with an eccentricity amount e from the central axis a1 is formed in the motor shaft 410.

The male screw member 420 is disposed such that its movement in the circumferential direction is restricted, and it can only move in the axial direction. One end of the male screw member 420 is formed integrally with the friction material holding portion 5 that holds the first friction material 3, and a male screw 421 is formed at the other end. This male screw 421 is screwed together with a female screw 431 of the female screw member 430, and is disposed such that a axis center thereof is aligned with the axis center a1 of the motor shaft.

A plurality of clutch members 432 that can contact with and separate from a shaft end 412 of the motor shaft 410 are provided in the female screw member 430 in a circumferential direction of a circle having a predetermined radius. With these clutch members 432, when an end portion of a leaf spring provided at the female screw member 430 is contacting with a contact portion 414 of the shaft end 412, the revolution of the motor shaft 410 is transmitted to the female screw member 430, which is freely rotatable with respect to the housing 40, by friction force at the contact portion 414. As a result, the female screw member 430 revolves in the circumferential direction.

The circumferential direction revolution of the male screw member 420 is regulated, and thus translatory movement of the male screw member 420 occurs due to the revolution of the female screw member 430, and the first friction material 3 is pressed against the disk 1. In other words, when the clutch members 432 are in contact with the motor shaft 410, the female screw member 430 and the male screw member 420 act as a first reduction portion and a first linear movement conversion portion.

Further, a one-way clutch 500 that only permits revolution of the female screw member 430 in one direction is provided in the outer circumference of the female screw member 430 so as to engage with the housing 40. Due to this one-way clutch 500, the female screw portion 430 is only permitted to revolve in a direction that releases the first friction material 3, and revolution in the opposite direction is prevented. Accordingly, when the brake is released, the revolution of the female screw member 430 does not reverse. Thus, even in the case that wear of the friction material 3 has progressed, this configuration acts as a wear regulation function which prevents a distance between the friction material 3 and the disk 1 from becoming equal to or larger than a predetermined value.

Moreover, the vehicular brake apparatus according to the second embodiment is provided with a cycloid reduction mechanism and a ramp mechanism.

The cycloid reduction mechanism includes an eccentric revolution portion 411 provided in the motor shaft 410, an external gear 440 that revolves around the central axis al due to revolution of the eccentric revolution portion 411, a pin hole 42 disposed in the housing 40 in which an internal pin 442 provided in the external gear 440, revolves, and an internal gear 450 as a link member that engages with the external gear 440.

Accordingly, with the eccentric revolution portion 411 as an input shaft, movement of the internal pin 442 is constrained by the pin hole 440, and the internal pin 442 slides within the internal circumference of the pin hole 42. As a result, the external gear 440 moves eccentrically with the central axis al as a center. This revolution of the external gear 440 is transmitted to the internal gear 450, and thus the internal gear 450 revolves in the circumferential direction at a reduction ratio determined in accordance with respective numbers of teeth of the internal and external gears. In other words, the internal gear 450 revolves in the axial direction as an output shaft. A revolution position of the internal gear 450 in the axial direction is fixed by the internal gear ring 450 being sandwiched between respective roller bearings 480 and 481.

Moreover, the second reduction portion includes a ramp mechanism as a linear movement conversion portion. The ramp mechanism is provided with a plurality of ramp portions 452, the roller bearing 481 and the clutch release member 490. The plurality of ramp portions 452 are formed in circumferential direction in a surface which is orthogonal to the axial direction of the internal gear 450, which is the link member, and have a predetermined gradient with respect to this orthogonal surface.

An external circumference of the clutch release member 490 contacts with the bearing 41, and an internal circumference thereof contacts with the shaft end 412 of the motor shaft 410 via a bearing 493. As a result, the clutch release member 490 is a link forming member that is freely slidable in the circumferential direction and the axial direction, and is disposed so as to contact with the roller bearing 481 on the surface orthogonal to the axial direction. Further, on the surface of the clutch release member 490 opposite to the internal gear 450, a protrusion 492 having a circular shape and being provided in the circumferential direction at a position at which the protrusion 492 abuts in an axial direction with the clutch members 432 provided in the female screw member 430 corresponding to a first reduction portion.

In the ramp mechanism having above mentioned configuration, revolution of the internal gear 450 is transmitted to the clutch release member 490 via the roller bearing 481. In a state in which no constraining force acts upon the clutch release member 490, the clutch release member 490 revolves integrally with and at the same speed as the roller bearing 481 and the internal gear 450, in the circumferential direction.

In addition, when the clutch 432 of the female screw member 430 abuts with the protrusion 492 of the clutch release member 490, constraining force acts upon the clutch release member 490 and a speed difference occurs in the circumferential direction revolution speed of the clutch release member 490 and the internal gear 450. As a result, a relative displacement in the axial direction of the clutch release member 490 and the internal gear 450 increases in accordance with the speed difference and the gradient of the ramp portion 452. Accordingly, the clutch release member 490 moves translatory in the leftward direction of FIG. 3 with respect to the internal gear 450, which does not move in the axial direction.

Further, the ramp portion 452 of the ramp mechanism is formed in the surface facing the internal gear 450. However, the ramp portion 452 may alternatively be formed in a surface 491 facing the clutch release member 490. Furthermore, the ramp portion 452 can be provided in both surfaces. Moreover, the ramp portion 452 may have a constant gradient or may include a plurality of surfaces, each of which having different gradient, that are continuously connected.

In this way, the clutch member 432 and the clutch release member 490 correspond to a reduction ratio switching portion.

Accordingly, the revolution of the motor 11 is reduced by the cycloid reduction mechanism, and the internal gear 450 revolves around the motor shaft as the output shaft. This revolution is converted to linear movement by the ramp mechanism, and can thus generate translatory movement in the axial direction of the clutch release member 490. In this manner, the second reduction portion combines the revolution speed reduction action of the cycloid reduction mechanism and the linear movement conversion action of the ramp mechanism to reduce speed and convert the revolution of the motor 11 to translatory movement of the clutch release member 490.

Figure 4:
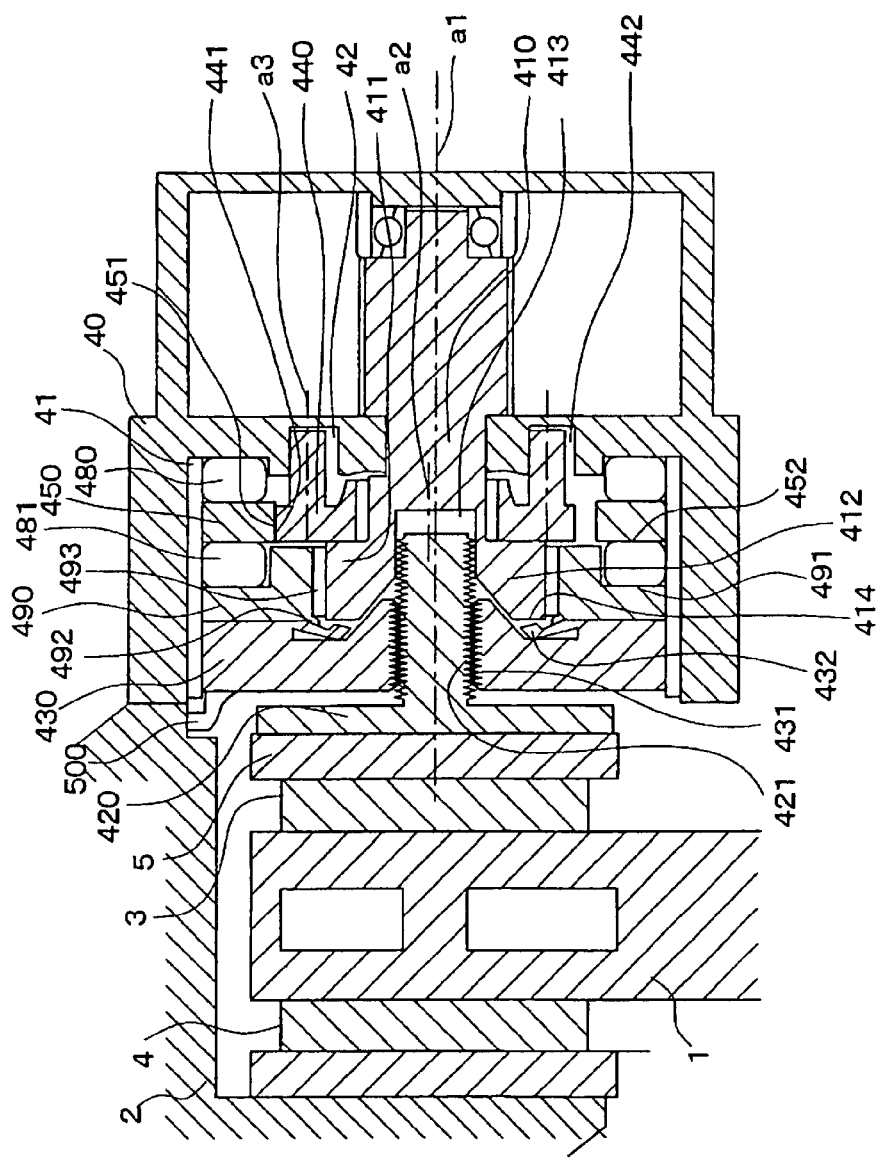
FIG. 4 is a cross-sectional view showing the brake appratus during brake operation according to the second embodiment.

Next, operation of the second embodiment will now be described with reference to FIGS. 3 to 5. Further, FIG. 3 is a cross-sectional view of the brake apparatus during an initial period of brake operation (hereinafter referred to as "a brake operation initiation period") at which a gap exists between the friction materials 3 and 4 and the disk 1. FIG. 4 is a cross-sectional view of the brake apparatus during the brake operation, namely, when at which braking force is generated by the pressing of the friction materials 3 and 4 against the disk 1.

Figure 5:
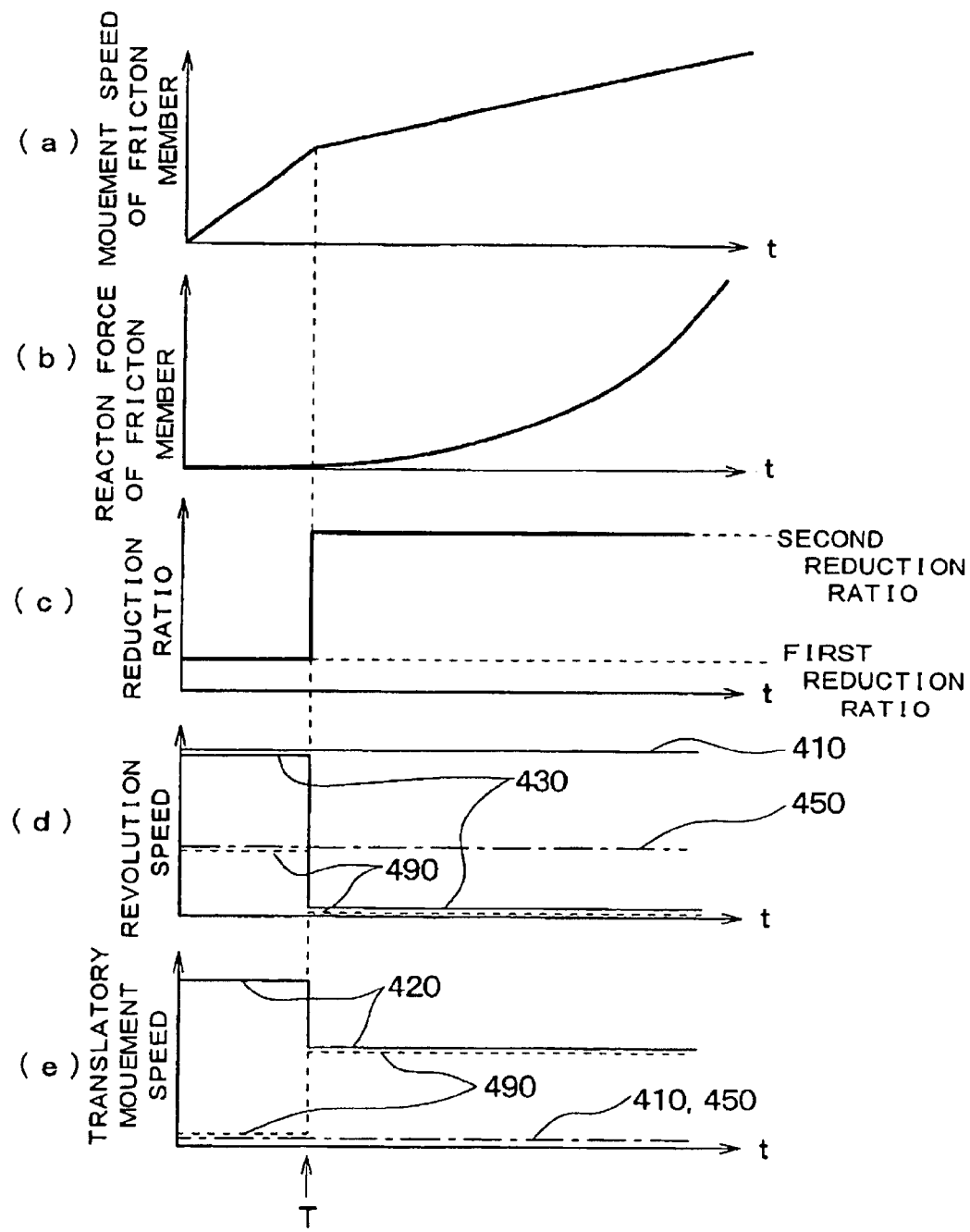
FIG. 5 is a time chart showing operating conditions of respective member of the second embodiment.

Further, FIG. 5 is a time chart showing operating conditions of respective members of the brake apparatus. Moreover, (d) and (e) in FIG. 5 show levels of the revolution speed and translation angle of each member, each of which is expressed in three levels including at 0, an intermediate level, and a high level. The lines has been drawn slightly above or below each other for the sole purpose of facilitating differentiation between them.

During the brake operation initiation period, almost no load acts upon the friction material 3, or alternatively, wear adjustment of the friction materials 3, 4 is carried out. As a result, the female screw member 430 and the shaft end 412 of the motor shaft 410 are in contact via the clutch member 432, and force can be transmitted between the two members. Further, simultaneously, the clutch member 432 and the protrusion 492 of the clutch release member 490 are separated.

When, in this state, the motor 11 rotates due to a driving signal of the ECU 102, torque of the motor shaft 410 is transmitted to the female screw member 430 via the clutch member 432, and the female screw member 430 revolves. Accordingly, relative translatory movement of the male screw member 420 screwed into the female screw member 430 moves with respect to the female screw member 430, and the friction material holding portion 5 and the first friction material 3 are pressed in the forward direction so as to approach near to the disk 1.

The speed of movement of the friction material 3 at this time is in accordance with a first reduction ratio of a screw mechanism acting as a first reduction portion (FIG. 5(c)). This first reduction ratio is a comparatively small reduction ratio as shown in FIG. 5(a). Further, almost no reaction force from the disk 1 is generated in the friction material 3 (FIG. 5(b)).

Moreover, at this time, with regard to each of the portions of the cycloid reduction mechanism which is the second reduction portion, the motor speed of the eccentric revolution portion 411, as the input shaft, is reduced by the external gear 440 and the internal gear 450, as the output shaft, and while the motor 11 is revolving the internal gear 450 continues revolving normally at this reduced speed. Further, with regard to the ramp mechanism, there is no constraining force from the male screw member 430 to the clutch release member 490, and thus the clutch release member 490 revolves at the same speed as the internal gear 430.

In this way, in the brake operation initiation period, a torque transmission path is formed from the motor shaft 410, to the clutch member 432, to the female screw member 430, to the male screw member 420, and finally to the first friction material 3.

This state continues until time point T. At time point T, when the first friction material 3 contacts with the disk 1, and as pressure is applied, the first reduction portion and the first linear movement conversion portion receive reaction force from the disk 1 and the first friction material 3. A quantity of state of this reaction force increases in accordance with the motor revolution.

On the other hand, at the same time as the male screw member 420 is retracted (moved in the forward direction) by the female screw member 430, the female screw member 430 is moved in the reverse direction (the direction to the right in the figure) due to a reaction force which is the aforementioned quantity of state, and the clutch member 432 contacts with the protrusion 492. Thus, as shown in FIG. 4, the female screw member 430 and the shaft end 412 of the motor shaft 410 are separated from each other, and revolution of the female screw member 430 stops because torque is no longer transmitted. At the same time, revolution of the clutch release member 490 that is in contact with the female screw member 430 also stops.

As a result, the linear movement conversion force of the ramp mechanism receiving torque of the internal gear of the cycloid transmission mechanism that is normally revolving acts to move the clutch release member 490 in the forward direction. The translatory movement of the clutch release member 490 integrally pushes the female screw member 430 and the male screw member 420, which are the first reduction portion and the first linear movement conversion portion, and thus the friction materials 3 and 4 sandwiches the disk 1 so that braking force increases. Increase in braking force corresponds to the increase in reaction force shown in FIG. 5(b).

The torque transmission path during the brake operation is formed from, the eccentric revolution portion 411 of the motor shaft 410, to the external gear 440, to the internal gear 450, to the ramp portion 452, to the roller bearing 481, to the clutch release member 490, to the protrusion 492, to the clutch member 432, to the female screw member 430, to the male screw member 420, to the first engagement member 3. The motor revolution, which has its speed reduced and is converted to linear movement force by the second reduction portion and the second linear movement conversion portion, presses the friction materials against the disk 1 via the first reduction portion and the first linear movement conversion portion, and thus braking force is generated.

As mentioned above, according to the second embodiment, during the brake operation initiation period, the motor speed is reduced by the first reduction ratio which is a low reduction ratio generated by the first reduction portion and the first linear movement conversion portion. Therefore, this revolution is converted into a force in the motor shaft direction, and this translatory direction force moves the friction materials in the disk direction. As a result, it is possible to rapidly move the friction materials by the comparatively low reduction ratio (the high gear ratio). Further, during the brake operation, the motor speed is reduced by the second reduction ratio which is a high reduction ratio generated by the second reduction portion and the second linear movement conversion portion. Therefore, this revolution is converted as force in the motor shaft direction, namely, into force in the translatory direction, and this translatory direction force moves the friction materials in the disk direction. As a result, it is possible to increase responsiveness of the output load and reduced electric power consumption of the motor.

Moreover, the second embodiment is affected by a reaction force that acts upon the friction materials and increases in accordance with the revolution of the motor. In the second embodiment, when the reaction force exceeds a predetermined value, the first reduction ratio generated by the first reduction portion and the first linear movement conversion portion is changed to the second reduction ratio generated by the second reduction portion and the second linear movement conversion portion. As a result, even if variation generates in the gap between the friction materials and the disk due to wear of the friction material 3, thermal expansion, and the like, it is always possible to execute switching of the reduction ratio at a position in which constant load is generated.

Accordingly, it is possible to prevent problems in which reduction ratio is switched at a given position that has no relationship with load. In other words, it is possible to prevent: a problem in which a gear ratio is switched to a high gear ratio at a position where the friction material applies insufficient force to the disk due to wear, and thus the motor over speeds and can no longer be used at an efficient speed; and a further problem in which, on the contrary, a target braking force cannot be obtained because switching to the high reduction ratio does not occur even though load has increased when the friction material thermally expands.

Further, when reaction forcing acting on the friction materials is small, such as during the brake operation initiation period, the reduction ratio of the variable speed reduction portion is set to the low reduction ratio. At the same time, the friction material is set such that it cannot return in a backward direction due to the one-way clutch 500, and thus it is possible to execute wear regulation of the friction material.

(A Modification of the Second Embodiment)

Figure 6:
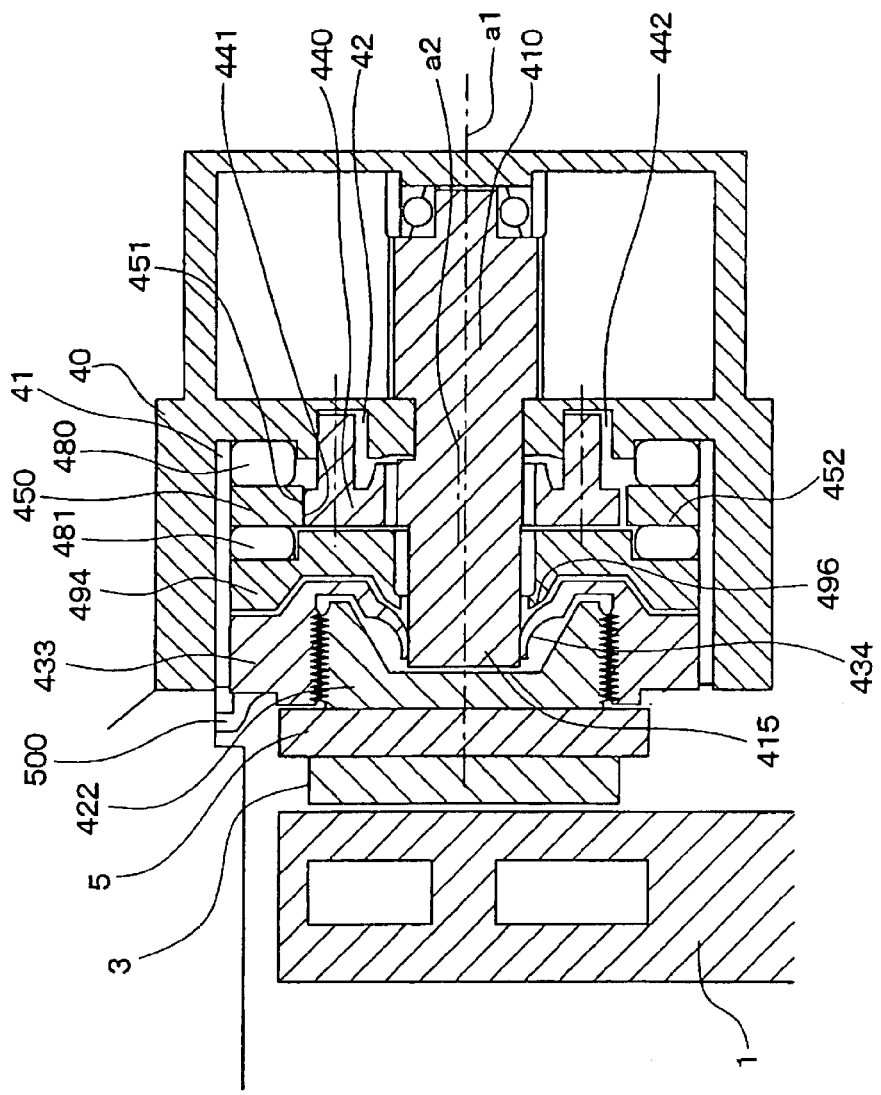
FIG. 6 is a cross-sectional view showing the brake appratus during an initial period of brake operation according to a modification of the second embodiment.
Figure 7:
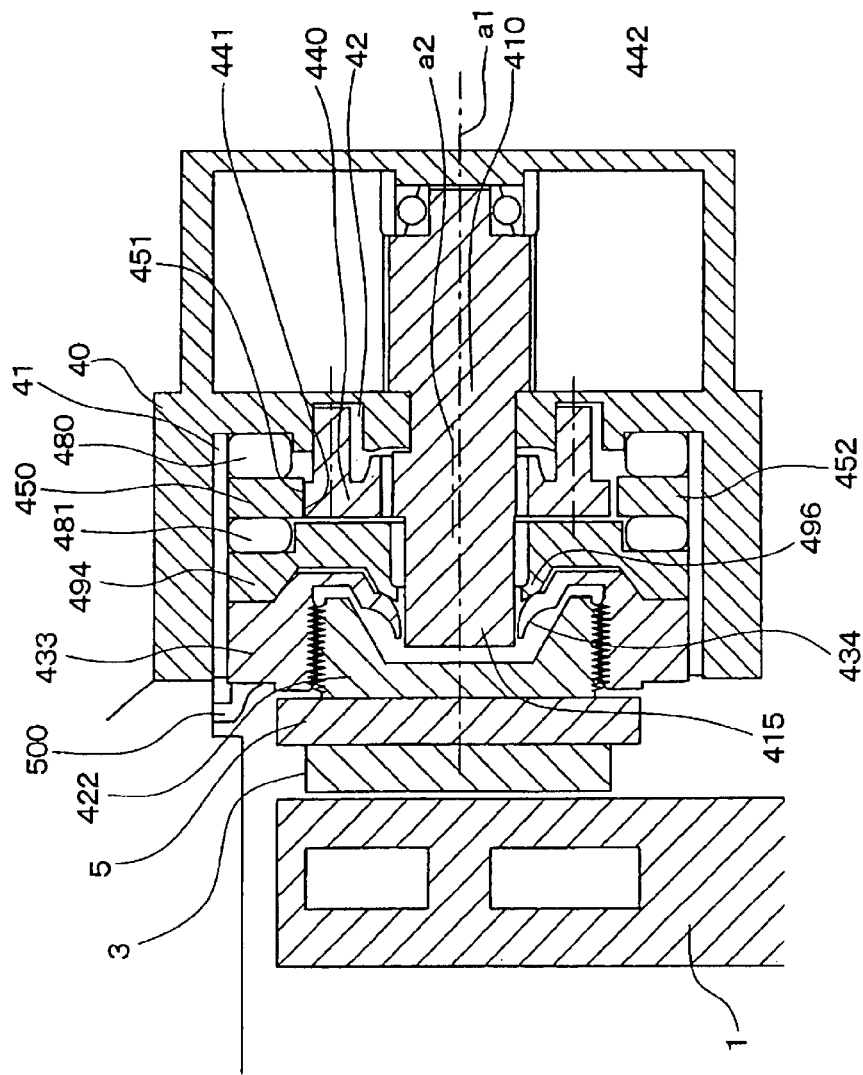
FIG. 7 is a cross-sectional view showing the brake appratus during the brake operation of the above modification of the second embodiment.

Further, according to a first modification of the second embodiment shown in FIGS. 6 and 7, the configuration of the first reduction portion and the first linear movement conversion portion and a configuration of a reduction ratio switching portion may be respectively changed as shown. FIG. 6 is a cross-sectional view showing a brake appratus during a brake operation initial period according to the first modification. FIG. 7 is a cross-sectional view during the brake appratus according to the first modification. Structural components of the first modification that are the same as those of the second embodiment have the same reference numerals attached, and their explanation will be omitted here.

A clutch member 434, which is a reduction ratio switching portion of the first modification, is formed integrally with a female screw member 433 so as to contact with a periphery wall surface of the motor shaft 410, during a brake operation initial period. In contrast to this, a protrusion 496 provided in a clutch release member 494 is disposed such that a clutch member 434 is opened in a radial direction, when the clutch release member 494 is moved in a forward direction by translatory conversion of the ramp mechanism.

A male screw member 422 is configured such that the diameter thereof the male screw member is larger than that of the second embodiment, and further, a concave portion is provided in a center of the male screw member 422 and the motor shaft 410 and the reduction ratio switching portion is inserted within this concave portion.

Figure 8:
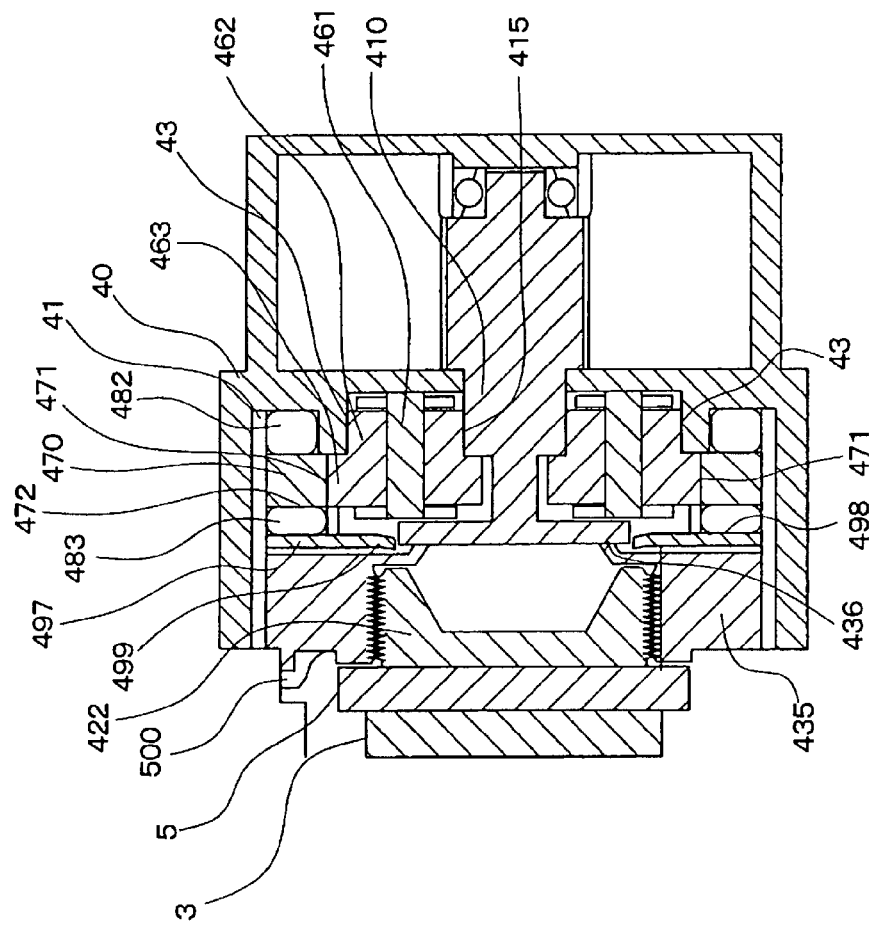
FIG. 8 is a cross-sectional view showing the brake appratus during an initial period of brake operation of another modification of the second embodiment.

Moreover, it is possible to replace the cycloid reduction mechanism that forms a portion of the second reduction portion of the aforementioned second embodiment with a planetary gear speed reduction mechanism, as shown by a cross-sectional view of a second form shown by FIG. 8. A planetary gear of the planetary gear speed reduction mechanism of the second form is formed from a first planetary gear 462 and a second planetary gear 463 having different numbers of teeth which are coaxial with a pin 461, all of these members being formed as a single integral member. In addition, the first planetary gear 462 is revolved so as to mesh with external teeth 415 provided at an axial center of the motor shaft 410, and internal teeth 43 provided in the housing 40.

The second planetary gear 463 meshes with an internal gear 470, acting as a link mechanism. The internal gear 470, similar to the internal gear 450 of the second embodiment, revolves around the circumferential direction within the housing 40 at a speed reduced by the second reduction ratio.

Accordingly, when the motor shaft 410 revolves, the first and second planetary gears 462 and 463 freely rotate around the pin 461 at a reduction ratio determined by a tooth number of the external gear 415 of the motor shaft 410 and a tooth number of the internal gear 43 of the housing 40. Further, by making the gear ratio of the second planetary gear 463 and the internal gear 470 and the gear ratio of the first planetary gear 462 and the housing 40 different, the internal gear 470 revolves. As a result, as compared to the motor shaft 410 which is an input shaft of the planetary gear mechanism, it is possible to substantially reduce the speed of the internal gear 470 which is an output shaft.

The revolution of the internal gear 470 attained in this manner, similar to the second embodiment, is converted to linear movement by a ramp portion 472 that is a ramp mechanism, a roller bearing 483 and a clutch release member 497, which are a second reduction portion and a second linear movement conversion portion, and transmitted to a clutch member 436 and a female thread member 435. The remaining elements of a first reduction portion and the first linear movement conversion portion are the same as that in the second embodiment, and thus an explanation will be omitted.

It should be noted that, it is possible to obtain the same effects as the second embodiment with the aforementioned first and second modifications.

(Third Embodiment)

Figure 9:
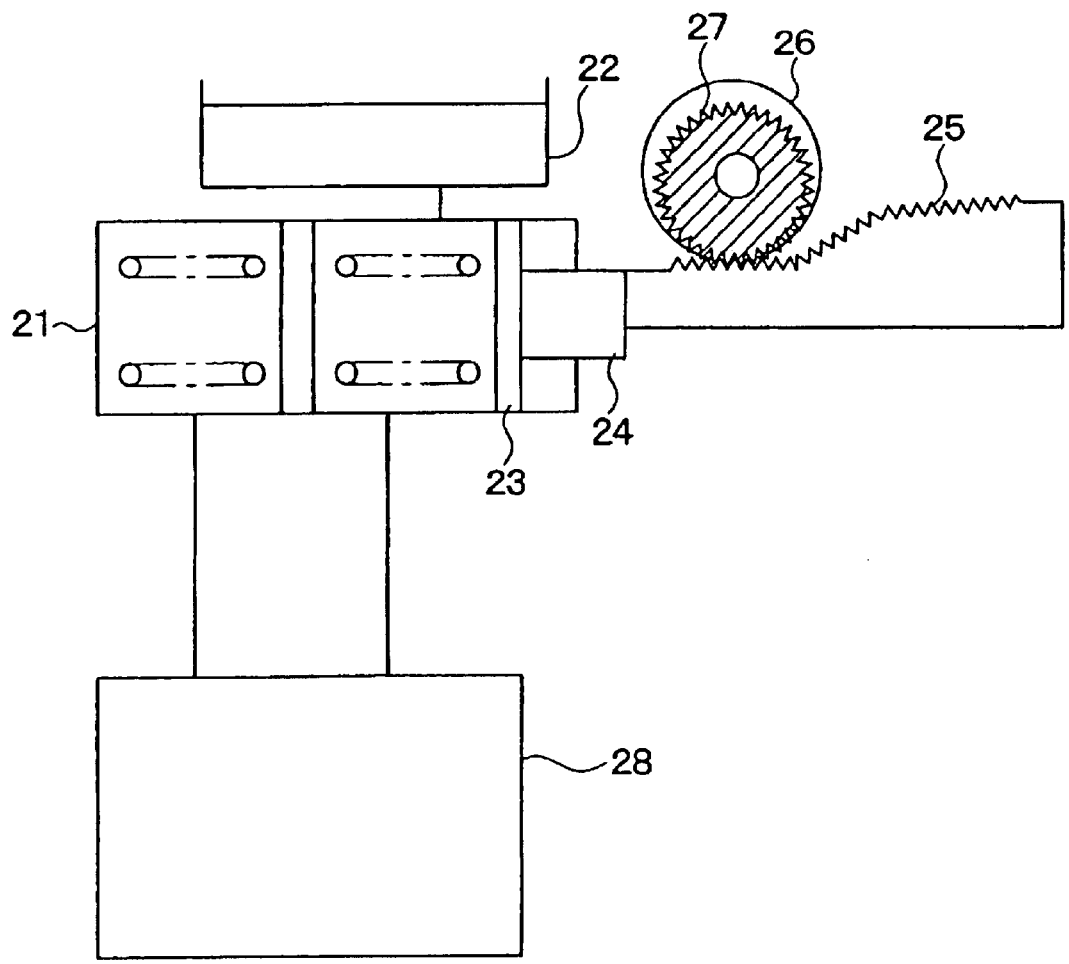
FIG. 9 is a schematic view showing a brake appratus according to a third embodiment of the present invention.

Next, a third embodiment of the present invention will be described with reference to FIG. 9. In the third embodiment, a piston operation of a master cylinder 21 used in the normal vehicular hydraulic pressure brake apparatus is controlled using the revolution of a motor. FIG. 9 is a block diagram schematically showing the structure of main portions of the present invention. A reservoir 22 is connected to a master cylinder 21 supplying a brake pressure to a wheel cylinder 28 of each wheel. A piston 23 of the master cylinder 21 generates a master cylinder pressure in accordance with a displacement attributed to a piston rod 24.

The piston road 24 is formed from a rack gear 25 having a gradient that changes with two-steps, a high and low step, in a straight linear movement direction. On the other hand, an output shaft of a motor 26 fixed to a vehicle side is provided with a pinion gear 27, which is a non-circular spur gear, that meshes with the rack gear 25. A variable gear mechanism operated as a variable reduction portion according to the third embodiment is configured so as to change in two-steps from a high gear ratio of 0.5 to a low gear ratio of 1. The variable gear mechanism also operates as a linear movement conversion portion.

Operation of the third embodiment structured in this way will be described with reference to time charts of FIG. 10. Further, in FIG. 10, for the sake of comparison, in the same way as aforementioned FIG. 2, the operation in the case of the normal constant gear ratio of 1 is also shown. The gear reduction ratio within the figure is indicated as a ratio with respect to a normal constant gear ratio of 1, as in the case of the first embodiment.

Prior to execution of the brake operation, the variable gear mechanism as the variable reduction portion is in a state in which a gear reduction ratio has an initial value of 0.5. When a brake pedal is depressed, a motor current of the motor 26 starts to increase in a step-like manner. In the range in which revolution of the motor 26 initially starts, a brake pressure (corresponding to an output load in FIG. 10) is small. However, since the variable gear mechanism is in high gear, it is possible to drive the variable gear mechanism without excessively increasing the motor speed. In other words, it is possible to run the motor highly efficiently and move the friction materials rapidly. In the case of the normal constant gear ratio of 1, the initial increase in the output load is delayed because the gear ratio is low. However, according to the third embodiment, the initial increase in the output load is rapid.

When the motor 26 revolves at a predetermined revolution, the gear reduction ratio of the variable gear mechanism changes in a step-like manner to a low gear side, from 0.5 to 1. As a result, a rate of increase of the output load becomes smaller. However, the speed of the motor does not increase excessively and it is possible to increase the output load at a speed that is efficient.

As described above, according to the third embodiment, the revolution output of the motor 26, which revolves in accordance with a depression amount of the brake pedal, is changed in two-steps from the high gear ratio to the low gear ratio by the variable gear mechanism. Further, the revolution is changed to linear movement and a friction material of the brake is pressed using the pressure of the master cylinder 21 generated by this linear movement. As a result, it is possible to move the friction material rapidly using the high gear ratio during the initial period of the brake operation, and following this, the low gear is changed to and the motor can be operated at high efficiency.

Further, a two-step change of the gear ratio of the rack gear 25, which is the variable gear mechanism according to the third embodiment, and the pinion gear 27 was described in the present embodiment. However, the present invention is not limited to this, and may be realized using a configuration in which the gear reduction ratio is changed continuously from, for example, 0.5 to 1.

(Modification of the Third Embodiment)

Figure 11:
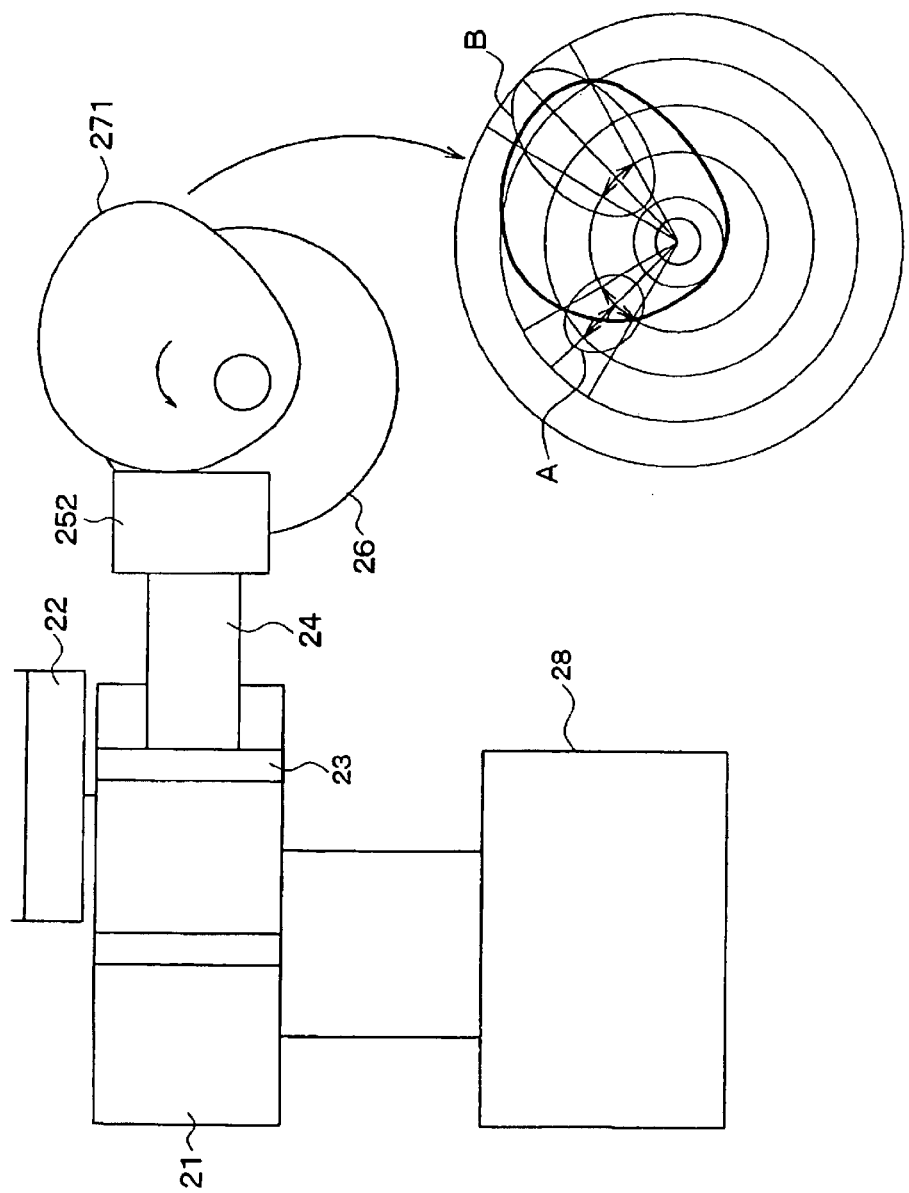
FIG. 11 is a schematic view showing a brake apparatus according to a modification of the third embodiment.
Figure 12:
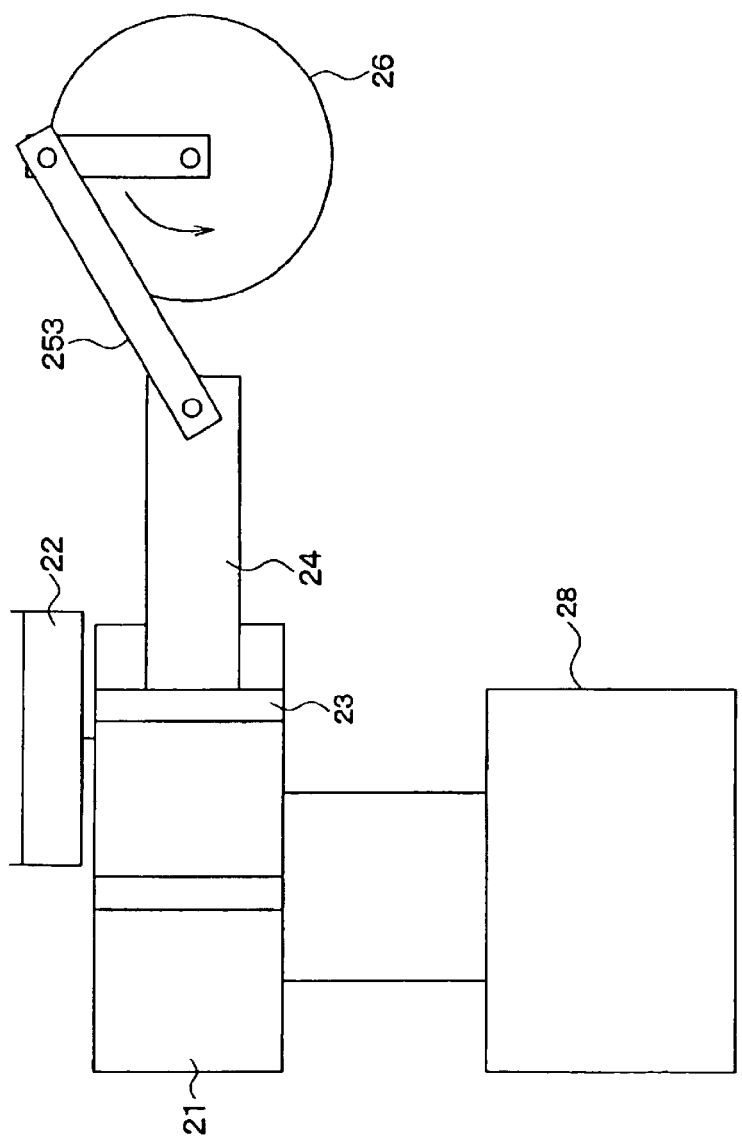
FIG. 12 is a schematic view showing a brake apparatus according to another modification of the third embodiment.

In the aforementioned third embodiment, the revolution of the motor 26 is reduced in speed and converted into linear movement by the pinion gear 27 and the rack gear 25, and thus reciprocation of the piston rod 24 is carried out. However, the present invention is not limited to this, and as shown in FIG. 11, a cam 271 that abuts with a belt 252 of the piston rod 24 may be adopted. Alternatively, a link 253 may be provided that connects the shaft of the motor 26 with the piston rod 24 as shown in FIG. 12.

The cam 271 provided at the shaft of the motor 26 has a radius that is set so as to increase in size with a turning angle of the cam. During an initial period of revolution (i.e. a brake operation initial period) the increase is large (as shown by A in FIG. 11), and during a final period of revolution the increase is small (as shown by B in FIG. 11). As a result, it is possible to obtain the same effect as achieved by varying gear ratio.

Further, in the case of the link 253, similar to the cam 271, it is possible to make a stroke amount of the master cylinder 21, with respect to the turning angle of the shaft of the motor 26, large during the brake operation initial period, and small during the final period.

(Fourth Embodiment)

Figure 13:
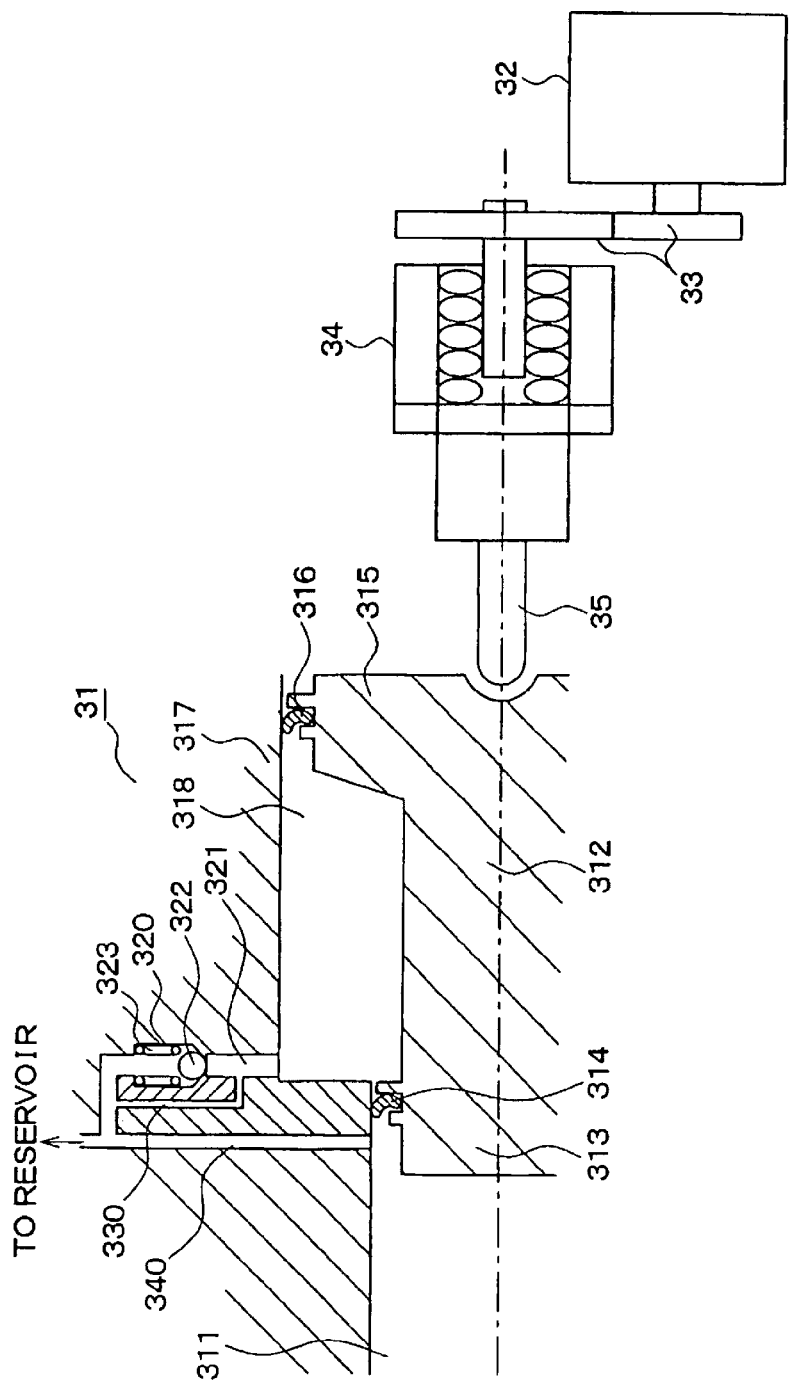
FIG. 13 is a cross-sectional view showing a brake apparatus according to a fourth embodiment according to the present invention.

Next, a fourth embodiment according to the present invention will be described with reference to the drawings. FIG. 13 is a block diagram schematically showing the fourth embodiment. A DC motor 32 revolves in accordance with a depression amount of a brake pedal (not shown) and the revolution of the DC motor 32 is transmitted to a speed reduction device 34, which also operates as a linear movement conversion portion, through an internal gear 33. The speed reduction device 34 converts the revolution of the DC motor 32 to a linear movement based on a predetermined reduction ratio, and reciprocation of the master cylinder piston 312 occurs via a push rod 35.

In the fourth embodiment, in place of the master cylinder used in a normal vehicular hydraulic pressure brake apparatus, a so-called fast-fill type master cylinder (hereinafter referred to as "master cylinder") 31 is adopted.

The master cylinder piston 312 is a stepped piston formed with a large diameter portion 315 at one end, and a small diameter portion 313 at the other end. The master cylinder piston 312 forms a master pressure by pushing a small diameter cap 314 and the primary hydraulic pressure chamber 311 on the side of the small diameter portion 313. Further, the large diameter portion 315 of the master cylinder piston 312 forms a supply chamber 318 filled with brake fluid with a large diameter cap 316, a cylinder 317 and the small diameter cap 314.

A supply support 321 is provided in the cylinder 317 to face the supply chamber 318. A communication groove 330 connected to a reservoir (not shown) and a relief valve 320, which separates from the communication groove 330 and communicates with the reservoir are provided in the supply support 312. The relief valve 320 is formed from a ball 322 which is provided between the relief valve 320 and the supply support 321 as a valve, and a spring 323 that applies a relief pressure to the ball 322. Further, a compensating port 340 that communicates to the primary hydraulic pressure chamber 311 and the reservoir is provided in the cylinder 317.

Next, an operation of the mater cylinder 31 configured as mentioned above will be described. FIG. 13 shows a piston position at initiation of brake operation. When the master cylinder piston 312 is displaced in the direction of the primary hydraulic pressure chamber 311 along with the initiation of the brake operation, the communication groove 330 is placed into a non-communicating state by high flow velocity. As a result, a hydraulic pressure of the supply chamber 318 becomes higher than a hydraulic pressure of the primary hydraulic pressure chamber 311, and the fluid of the supply chamber 318 is pushed out to the primary hydraulic pressure chamber 311 via the small diameter cap 314. As a result of the brake fluid movement, a fluid amount of the primary hydraulic pressure chamber 311 increases rapidly. Therefore, it is possible to rapidly increase the master cylinder pressure with a short stroke. In other words, a rapid initial increase of a brake pressure can be carried out.

Further, when the stroke of the master cylinder piston 312 increases, and the hydraulic pressure of the supply chamber 318 increases so as to be greater than the relief pressure, the ball 322 pushes up the spring 323, the relief valve 320 is opened, the fluid of the supply chamber 318 flows into the reservoir, and the hydraulic pressure within the supply chamber 318 is maintained at the relief pressure. At the same time, a pressure of the primary hydraulic pressure chamber 311 increases due to displacement of the small diameter portion 313 and the small diameter cap 314. Since the increase in pressure of the supply chamber 318 at this time is comparatively gentle, the fluid of the supply chamber 318, which is pushed out by the large diameter portion 318 and the large diameter cap 316 in accordance with the stroke of the master cylinder piston 312, flows to the reservoir throug the communication groove 330. By adopting the stepped master cylinder piston 312 and the communication groove 330 in this way, it is possible to change the piston diameter from a larger diameter to a small diameter while the piston strokes. Accordingly, in the system linking the motor 32 to the master cylinder pressure (i.e., displacement of the friction material, namely, the brake pressure), the master cylinder 31 corresponds to a variable reduction portion.

As described above, by adopting a fast-fill type master cylinder as the master cylinder 31 reciprocated by the linear movement generated from the motor 31 in the brake apparatus according to the fourth embodiment, it is possible for the master pressure to be initially increased rapidly at a rate of increase greater than the increase in the stroke amount, during the initial period of the stroke, and also possible to increase the master pressure in accordance with the stroke during the final period of the stroke. At this time, the motor 32, which drives the master cylinder piston 312 at a constant reduction ratio, executes operation in the same way as indicated by the solid line in FIG. 10, that was used to explain the operation of the third embodiment. Thus, it is possible to rapidly move the friction material during the initiation of the brake operation, and following this, it is possible to operate highly efficiently without excessively raising the speed of the motor.

While the above discription is of the preferred embodiments of the present invention, it should be appreciated that the invention may be modified, altered, or varied without deviating from the scope and fair meaning of the following claims.

What is claimed is:

1. A vehicular brake apparatus comprising:

a motor that is electrically driven to revolve a shaft thereof;

a reduction portion for reducing a speed of revolution of the shaft of the motor at a predetermined near ratio;

a movement conversion portion for converting the revolution, which has already been reduced in speed by the reduction portion, to a linear movement, and for pressing a friction member to a disc revolving integrally with a vehicle wheel for generating a braking force; and a press member located between the movement conversion portion and the friction member and having clutch members that can selectively contact a first contact portion provided in a linear movement portion as an output portion of the movement conversion portion or a second contact portion provided in an end portion of the shaft of the motor, the clutch members being located alone a circumferential direction of the shaft and deformable in an axial direction of the shaft;

wherein the press member includes a female screw at a center portion thereof, and a male screw integrally fixed with the friction member at a side of the friction member opposite the disc, the male screw being screwed in the female screw.

2. The vehicular brake apparatus according to claim 1, wherein:

the reduction portion is configured as a cycloid reduction mechanism.

3. The vehicular brake apparatus according to claim 2, wherein:

the movement conversion portion is configured as a ramp mechanism including a ramp portion located on a rotatable ring portion provided in the cycloid reduction mechanism, an anti-rotatable ring portion facing the rotatable ring portion and a revolution member located between the rotatable ring portion and the anti-rotatable ring portion.

* * * * *